United States Patent
Choi (10) Patent No.: US 8,243,934 B2
(45) Date of Patent: Aug. 14, 2012

(54) ELECTRONIC DEVICE AND ENCRYPTION METHOD THEREOF

(75) Inventor: Yun-ho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 988 days.

(21) Appl. No.: 12/046,790

(22) Filed: Mar. 12, 2008

(65) Prior Publication Data

US 2009/0097656 A1    Apr. 16, 2009

(30) Foreign Application Priority Data

Oct. 10, 2007   (KR) ................. 10-2007-0102060

(51) Int. Cl.
*H04L 9/00* (2006.01)
*H04L 9/08* (2006.01)

(52) U.S. Cl. .......... 380/277; 380/44; 380/278; 380/284; 380/285

(58) Field of Classification Search ................ None
See application file for complete search history.

(56) References Cited

U.S. PATENT DOCUMENTS

| | | | |
|---|---|---|---|
| 6,636,966 B1 * | 10/2003 | Lee et al. ................. | 713/165 |
| 7,092,527 B2 * | 8/2006 | Foster et al. ............. | 380/277 |
| 7,103,572 B1 * | 9/2006 | Kawaguchi et al. ..... | 705/40 |
| 7,174,568 B2 * | 2/2007 | Chatani et al. ........... | 726/27 |
| 7,724,907 B2 * | 5/2010 | Candelore ................. | 380/281 |
| 2003/0152223 A1 * | 8/2003 | Yamada .................... | 380/201 |
| 2004/0156503 A1 * | 8/2004 | Bell et al. ................. | 380/44 |
| 2005/0025316 A1 * | 2/2005 | Pelly et al. ............... | 380/277 |
| 2005/0228877 A1 * | 10/2005 | Monitzer et al. ......... | 709/223 |
| 2006/0280303 A1 * | 12/2006 | Gupte ....................... | 380/239 |
| 2007/0008568 A1 * | 1/2007 | Senoh ....................... | 358/1.14 |
| 2007/0156587 A1 * | 7/2007 | Yu et al. ................... | 705/50 |
| 2007/0283151 A1 * | 12/2007 | Nakano et al. ........... | 713/168 |
| 2007/0286151 A1 * | 12/2007 | Prakash et al. ........... | 370/349 |
| 2008/0075290 A1 * | 3/2008 | Nishiguchi et al. ...... | 380/278 |
| 2008/0086641 A1 * | 4/2008 | Rodgers et al. .......... | 713/176 |

FOREIGN PATENT DOCUMENTS

| KR | 10-2005-0100334 A | 10/2005 |
|---|---|---|
| KR | 10-2007-0075144 A | 7/2007 |

* cited by examiner

*Primary Examiner* — Philip Chea
*Assistant Examiner* — Feliciano Mejia
(74) *Attorney, Agent, or Firm* — Sughrue Mion, PLLC (57) ABSTRACT

An electronic device and an encryption method thereof are provided. The electronic device includes a control unit which encrypts an encryption key using an inherent key, and transmits the encrypted encryption key and a key index corresponding to the inherent key to a recording medium. Accordingly, encrypted content stored in a recording medium can be decrypted when an electronic device is malfunctioning or replaced with a new one.

15 Claims, 5 Drawing Sheets

ELECTRONIC DEVICE AND ENCRYPTION METHOD THEREOF

CROSS-REFERENCE TO RELATED APPLICATIONS

This application claims priority from Korean Patent Application No. 10-2007-0102060, filed on Oct. 10, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to an electronic device and an encryption method thereof, and more particularly, to providing an electronic device which is capable of decrypting encrypted content stored in a recording medium when the electronic device is malfunctioning or replaced and an encryption method thereof.

2. Description of the Related Art

Broadcasting stations provide users with diverse services via digital broadcast signals including audio, images and data which are transmitted and received in a digital manner. Since data as well as audio and images can be transmitted, users are provided diverse services via televisions.

Users can store content provided from broadcasting stations in a recording medium included in the electronic device or attachable to the electronic device, and use the stored content. The broadcasting stations require the content to be encrypted and stored in the recording medium in order to prevent the content from being improperly redistributed. In particular, broadcasting stations need purchased content to be encrypted. The content indicates diverse information including digitalized text, code, voice, sound, image, and video.

A conventional electronic device encrypts content using an encryption key and stores the content in a recoding medium, and the encryption key is encrypted using an inherent key of the electronic device and stored in the recording medium. When the electronic device malfunctions and is thus booted or replaced, the encrypted content stored in the recording medium cannot be decrypted and accordingly cannot be used any more.

That is, the inherent key of the electronic device is a pre-stored key when the electronic device is manufactured, so individual electronic device has its own inherent key. Accordingly, when the conventional electronic device malfunctions or is replaced with another electronic device, the encryption key encrypted using the inherent key cannot be decrypted because the inherent key is not known, and the content encrypted using the encryption key cannot be decrypted.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides an electronic device which is able to decrypt encrypted content stored in a recording medium using authentication between the recording medium and the electronic device by a server and using an inherent key list stored in the server, and an encryption method thereof.

According to an exemplary aspect of the present invention, there is provided an electronic device including a storage unit which pre-stores an inherent key and a key index corresponding to the inherent key, and a control unit which generates an encryption key, encrypts the encryption key using the inherent key, and transmits the encrypted encryption key and the key index to a recording medium.

The control unit may encrypt a certificate received from a server device connected through a network using a public key, and transmit the encrypted certificate to the recording medium.

The control unit may authenticate the recording medium using a private key received from the server device connected through the network, and transmit the key index received from the recording medium to the server device if the authentication is successful.

The control unit may receive an inherent key corresponding to the key index from the server device, and may decrypt the encrypted encryption key received from the recording medium using the received inherent key.

The control unit may re-encrypt the decrypted encryption key using a new inherent key, and may transmit the re-encrypted encryption key to the recording medium.

The control unit may map the key index with an identifier indicating a manufacturer, and transmit the key index mapped with the identifier to the recording medium.

The electronic device may be a broadcast receiving device which transmits and receives a broadcast signal.

According to another exemplary aspect of the present invention, there is provided a server device including a storage unit which stores an inherent key list comprising a pre-stored inherent key and a key index corresponding to the inherent key, and a control unit which detects an inherent key corresponding to a key index received from a recording medium connected to the server device, and decrypts an encrypted encryption key received from the recording medium using the detected inherent key.

The control unit may re-encrypt the decrypted encryption key using one of the inherent keys included in the inherent key list, and store the re-encrypted encryption key in the recording medium.

According to another exemplary aspect of the present invention, there is provided an encryption method including generating an encryption key, encrypting content using the generated encryption key, and encrypting the encryption key using a pre-stored encryption key, and transmitting an encrypted certificate, the encrypted content, the encrypted inherent key, and a key index corresponding to an inherent key.

The encryption method may further include encrypting the certificate received from a server, wherein in the transmitting operation, the encrypted certificate, the encrypted content, the encrypted encryption key, and the key index corresponding to the inherent key are transmitted to a recording medium.

According to another exemplary aspect of the present invention, there is provided a decryption method including receiving an inherent key corresponding to a key index received from a recording medium from a server, and decrypting an encrypted encryption key received from the recording medium using the received inherent key.

The decryption method may further include authenticating the recording medium using a private key received from the server connected through a network, re-encrypting the decrypted encryption key using a new inherent key, and storing the re-encrypted encryption key to the recording medium.

According to another exemplary aspect of the present invention, there is provided a decryption method including receiving an encrypted encryption key and a key index corresponding to an inherent key which encrypts the encryption key from a connected recording medium, and decrypting the encrypted encryption key using the inherent key corresponding to the key index.

The decryption method may further include receiving a certificate from the recording medium, and thereby authenticating the recording medium, re-encrypting the decrypted encryption key using a new inherent key, and storing the re-encrypted encryption key to the recording medium.

The decrypting operation may include detecting an inherent key corresponding to the key index from a preset inherent key list, and decrypting the encrypted encryption key using the detected inherent key.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 1:
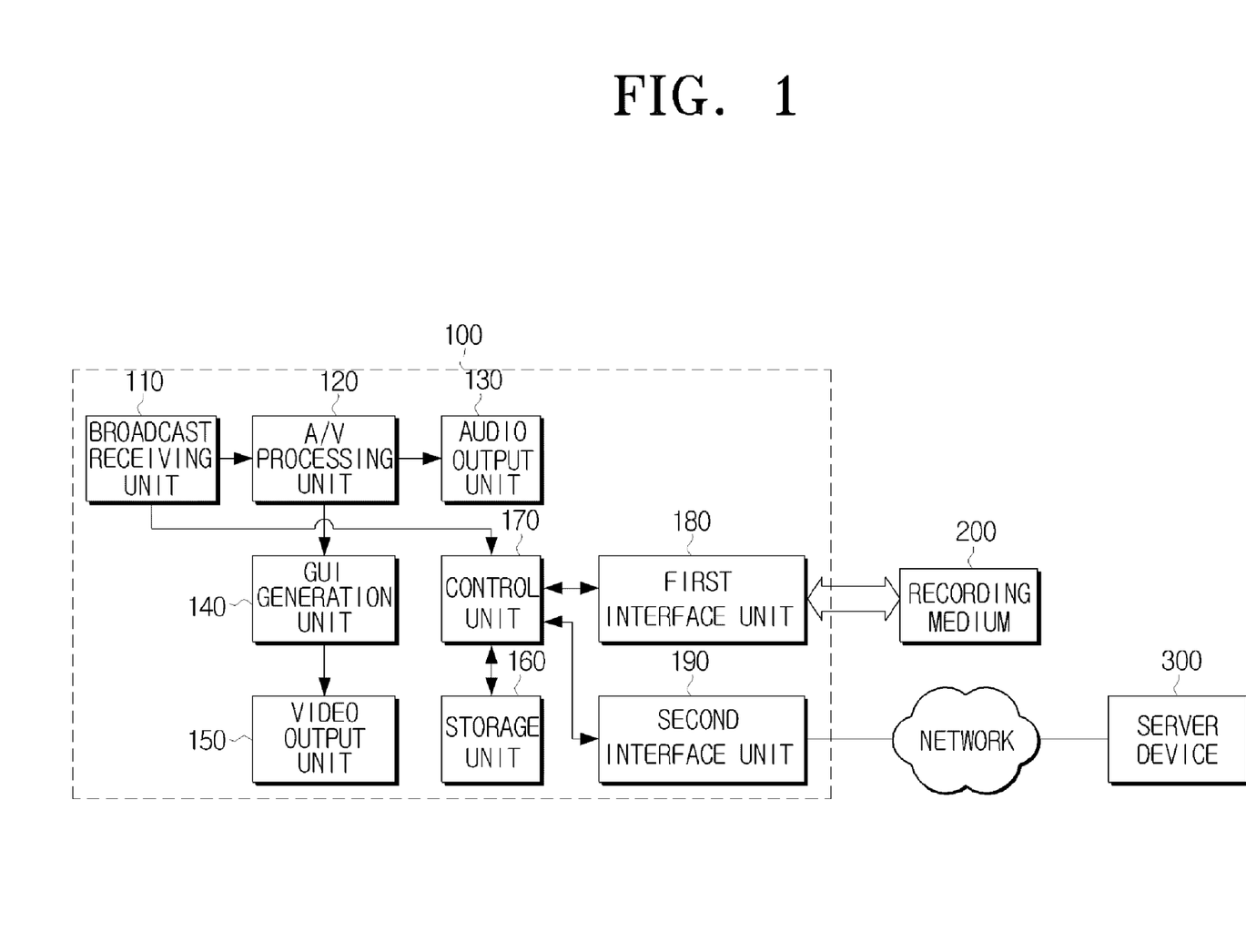
FIG. 1 is a block diagram of an electronic device according to an exemplary embodiment of the present invention.

FIG. 1 is a block diagram of an electronic device according to an exemplary embodiment of the present invention.

In FIG. 1, the electronic device 100 includes a broadcast receiving unit 110, an audio and video (A/V) processing unit 120, an audio output unit 130, a graphical user interface (GUI) generation unit 140, an video output unit 150, a storage unit 160, a control unit 170, a first interface unit 180, and a second interface unit 190.

The broadcast receiving unit 110 wiredly or wirelessly receives and decodes broadcasts or content transmitted from a broadcasting station or a satellite.

The A/V processing unit 120 processes a broadcast signal output from the broadcast receiving unit 110, for example, performs video decoding, video scaling, and audio decoding, and then transmits a video signal to the GUI generation unit 140 and transmits an audio signal to the audio output unit 130.

The audio output unit 130 outputs the audio signal through a speaker or to an external device connected through an external output terminal.

The GUI generation unit 140 generates a GUI to display on the video output unit 150, and adds the generated GUI to an image output from the A/V processing unit 120.

The video output unit 150 displays the GUI-added image on a display or outputs the GUI-added image to the external device connected through the external output terminal (not shown).

The storage unit 160 stores programs to control the overall operation of the electronic device 100, an encryption key, a preset inherent key of the electronic device 100, a key index corresponding to the inherent key, and a certificate. Content indicates diverse information including digitalized text, code, voice, sound, image, and video, and includes still images, moving images, and audio files.

The control unit 170 encrypts a certificate received from the server device 300 through the second interface unit 190 using a public key. The second interface unit 190 is connected to the server device 300 through the network. The control unit 170 stores the encrypted certificate in the recording medium 200 through the first interface unit 180.

The control unit 170 generates an encryption key, and encrypts the generated encryption key using the inherent key of the electronic device 100 stored in the storage unit 160. The control unit 170 may generate an encryption key and encrypt an inherent key using the encryption key when the inherent key needs to be encrypted, as well as may firstly generate an encryption key and store the encryption key in the storage unit 160. A method for generating an encryption key is well-known in an encryption algorithm, so detailed description is omitted here. There is a method for generating an encryption key at random using a random function as an example.

The control unit 170 stores the encrypted encryption key and a key index corresponding to the inherent key in the recording medium 200 through the first interface unit 180. The inherent key and the key index are provided when the electronic device 100 is manufactured, and are stored in the storage unit 160 of the electronic device 100, wherein the key index mapped with an identifier indicating a manufacturer is stored.

The control unit 170 encrypts the content output from the broadcast receiving unit 110 using the encryption key. The control unit 170 stores the encrypted content in the recording medium 200 through the first interface unit 180.

The control unit 170 authenticates the recording medium 200 using a private key received from the server device 300. That is, the control unit 170 authenticates the recording medium 200 by decrypting the encrypted certificate using the private key received from the server device 300.

If the control unit 170 receives the key index and the encrypted encryption key from the recording medium 200, the control unit 170 transmits the key index to the server device 300 through the second interface unit 190. Subsequently, if the control unit 170 receives the inherent key corresponding to the key index from the server device 300, the control unit 170 decrypts the encrypted encryption key using the received inherent key, re-encrypts the decrypted encryption key using a new inherent key, and stores the re-encrypted encryption key in the recording medium 200.

That is, if the electronic device 100 is replaced with another, the inherent key of the electronic device 100, which is used to encrypt the encryption key, is different from an inherent key of the new electronic device 100, so the new electronic device 100 decrypts the encrypted encryption key received from the recording medium 200 using the inherent key of the previous electronic device 100 received from the server device 300, re-encrypts the decrypted encryption key using the new inherent key, and stores the re-encrypted encryption key in the recording medium 200.

Figure 2:
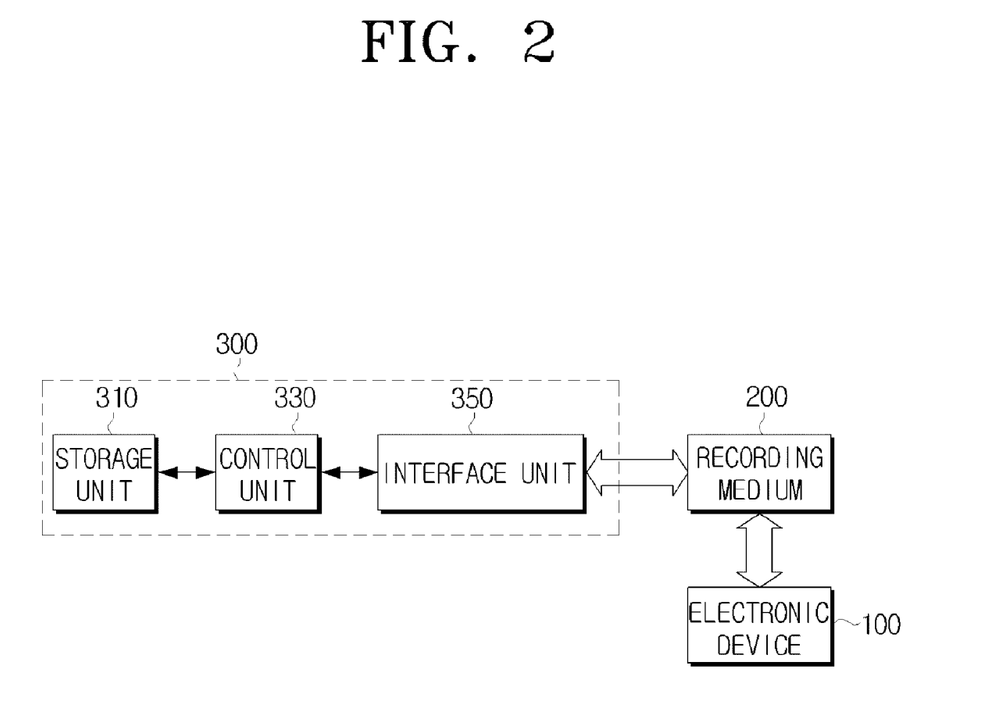
FIG. 2 is a block diagram of a server device according to an exemplary embodiment of the present invention.

FIG. 2 is a block diagram of a server device according to an exemplary embodiment of the present invention. The server device 300 decrypts content stored in the recording medium when the electronic device 100 is malfunctioning and thus not booted. The server device 300 according to an exemplary embodiment of the present invention includes a storage unit 310, a control unit 330, and an interface unit 350.

The storage unit 310 stores programs to control the overall operation of the server device 300, a private key to authenticate the recording medium 200 and the electronic device 100, and an inherent key list. The inherent key list includes inherent keys of a plurality of electronic devices, and key indexes corresponding to each inherent key. The inherent key list is preset and stored when the plurality of electronic devices are manufactured.

The control unit 330 authenticates the recording medium 200 by decrypting the certificate read from the recording medium 200 using the private key.

That is, when the electronic device 100 is malfunctioning, if the server device 300 is connected to a recording medium 200 which is included in the electronic device 100, or an external recording medium 200, the control unit 330 reads the certificate encrypted using the public key from the recording medium 200 through the interface unit 350. Subsequently, the control unit 330 decrypts the certificate using the private key stored in the storage unit 310, thereby authenticating the recording medium 200, and transmits a message indicating that the authentication is successful to the recording medium 200.

The control unit 330 receives the key index and the encrypted encryption key from the recording medium 200 through the interface unit 350, and detects an inherent key corresponding to the received key index from the inherent key list stored in the storage unit 310.

In more detail, the recording medium 200 receives the message indicating that authentication is successful from the server device 300, and transmits the encrypted encryption key and the key index stored by the electronic device 100 to the server device 300. Subsequently, the control unit 330 detects an inherent key corresponding to the received key index with reference to the inherent key list stored in the storage unit 310. The key index is an index corresponding to the inherent key used to encrypt the encryption key.

The control unit 330 decrypts the encrypted encryption key using a detected inherent key, re-encrypts the decrypted encryption key using a new inherent key, and stores the re-encrypted encryption key in the recording medium 200. The detected inherent key is an inherent key of the malfunctioning electronic device 100, and the new inherent key is an inherent key of the repaired electronic device 100. That is, if a main board of the electronic device 100 is replaced with a new main board due to malfunctioning of the electronic device 100, an inherent key of the malfunctioning electronic device 100 is changed to a new inherent key of the electronic device having the new main board 100.

Figure 3:
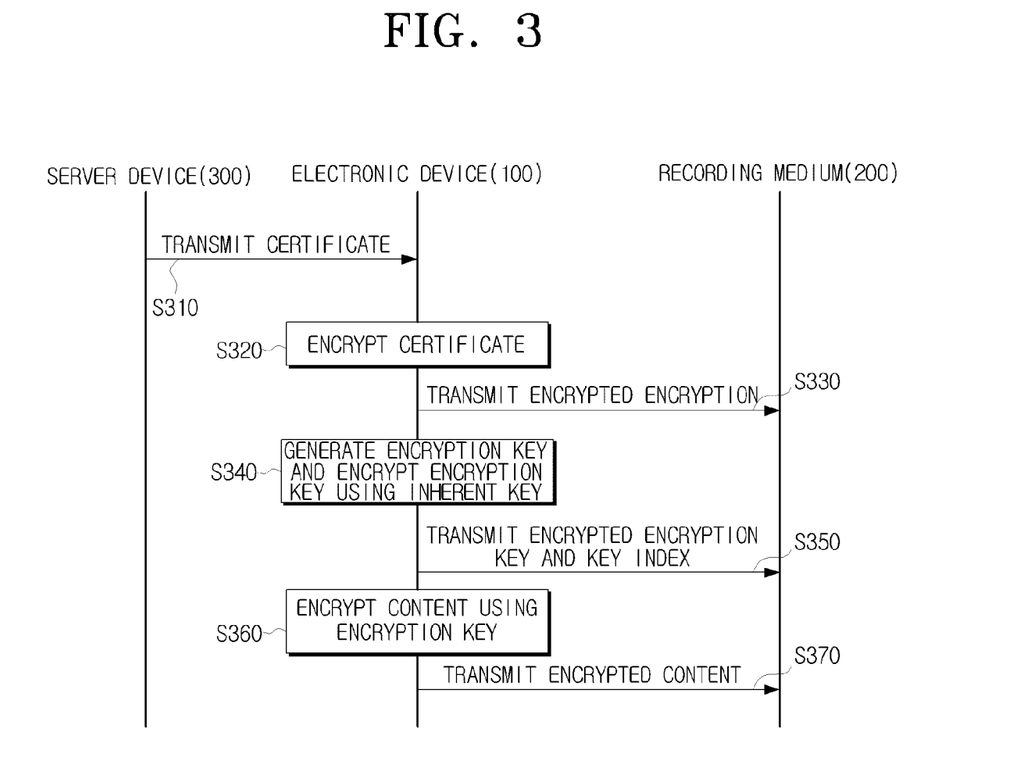
FIG. 3 is a flowchart describing an encryption method of an electronic device according to an exemplary embodiment of the present invention.

FIG. 3 is a flowchart describing an encryption method of an electronic device according to an exemplary embodiment of the present invention.

With reference to FIG. 3, the control unit 170 receives a certificate from the server device 300 in operation S310, and encrypts the certificate using a public key in operation S320. The electronic device 100 is connected to the server device 300 through the network.

The control unit 170 transmits the encrypted certificate to the recording medium in operation S330. That is, the control unit 170 stores the encrypted certificate in the recording medium 200 through the first interface unit 180. The recording medium 200 may be a recording medium which is included in the electronic device 100 or an external recording medium which can be connected to the electronic device 100.

In operation S340, the control unit 170 generates an encryption key, and encrypts the generated encryption key using a preset inherent key. The inherent key is preset when the electronic device 100 is manufactured, and each electronic device has a different inherent key. A method for generating the encryption key (operation S340) using an encryption algorithm is well-known in the art, so detailed description is omitted here.

In operation S350, the control unit 170 transmits the encrypted encryption key and a key index corresponding to the inherent key to the recording medium 200. The key index is preset the same as the inherent key is preset when the electronic device 100 is manufactured, and the key index is mapped and pre-stored with an identifier indicating a manufacturer.

The control unit 170 encrypts content using the encryption key in operation S360, and transmits the encrypted content to the recording medium 200.

In greater detail, the control unit 170 encrypts the content received from a broadcast station or a satellite using the encryption key generated in operation S340, and stores the encrypted content in the recording medium 200.

Figure 4:
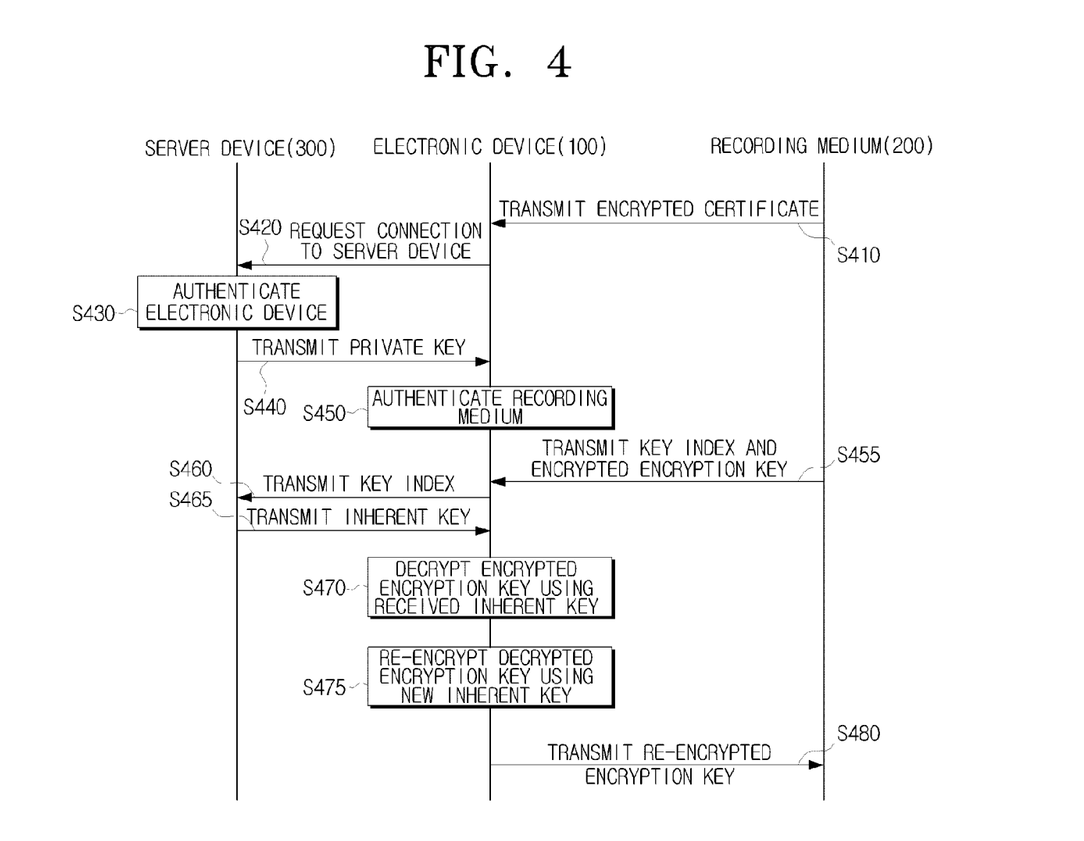
FIG. 4 is a flowchart describing a decryption method of an electronic device according to an exemplary embodiment of the present invention.

A method for the electronic device encrypting an encryption key and content has been described above. Now, a method for decrypting an encrypted encryption key stored in a recording medium will be given below. The encrypted encryption key may be decrypted in an electronic device or a server device. FIG. 4 is a flowchart describing a method of an electronic device decrypting an encrypted encryption key stored in the recording medium. That is, FIG. 4 is a flowchart describing a method for an electronic device decrypting an encrypted encryption key stored in a recording medium when the electronic device is replaced.

With reference to FIG. 4, if the electronic device 100 is connected to the recording medium 200, the control unit 170 reads a certificate from the recording medium 200 in operation S410.

Subsequently, the control unit 170 requests connection to the server device 300 in operation S420. That is, the control unit 170 requests connection to the server device 300 by transmitting a message requesting connection and the certificate to the server device 300.

In operation S430, the server device 300 authenticates the electronic device 100 by decrypting the received certificate using a preset private key. The electronic device 100 is connected to the server device 300 through the network.

Subsequently, the server device 300 transmits the private key to the electronic device 100 in operation S440, and the control unit 170 authenticates the recording medium 200 using the received private key in operation S455. That is, the control unit 170 authenticates the recording medium 200 by decrypting the certificate read in operation S410 using the private key read from the server device 300, and transmits a message indicating the authentication is successful to the recording medium 200.

Subsequently, the control unit 170 receives a key index and the encrypted encryption key from the recording medium 200 in operation S455. The encrypted encryption key is an encrypted key which is encrypted using an inherent key of the electronic device 100 before the electronic device 100 is replaced, and the key index is a key index corresponding to the inherent key of the electronic device 100 before the electronic device 100 is replaced.

Subsequently, the control unit 170 transmits the key index received from the recording medium to the server device 300 in operation S460.

In operation S465, the server device 300 detects the inherent key corresponding to the received key index from the preset inherent key list, and transmits the detected inherent key to the electronic device 100. That is, the inherent key transmitted from the server device 300 to the electronic device 100 is the inherent key of the electronic device before replacement.

In operation S470, the control unit 170 decrypts the encrypted encryption key received from the recording medium using the inherent key received from the server device 300.

In operation S475, the control unit 170 re-encrypts the decrypted encryption key using the inherent key of the electronic device 100. That is, the control unit 170 re-encrypts the encryption key decrypted in operation S470 using the inherent key of the new electronic device 100. The inherent key of the new electronic device 100 is one of the inherent keys included in the inherent key list stored in the server device 300.

In operation S480, the control unit 170 stores the re-encrypted encryption key in the recording medium 200. That is, the recording medium 200 stores the encryption key encrypted using the inherent key of the new electronic device 100.

Figure 5:
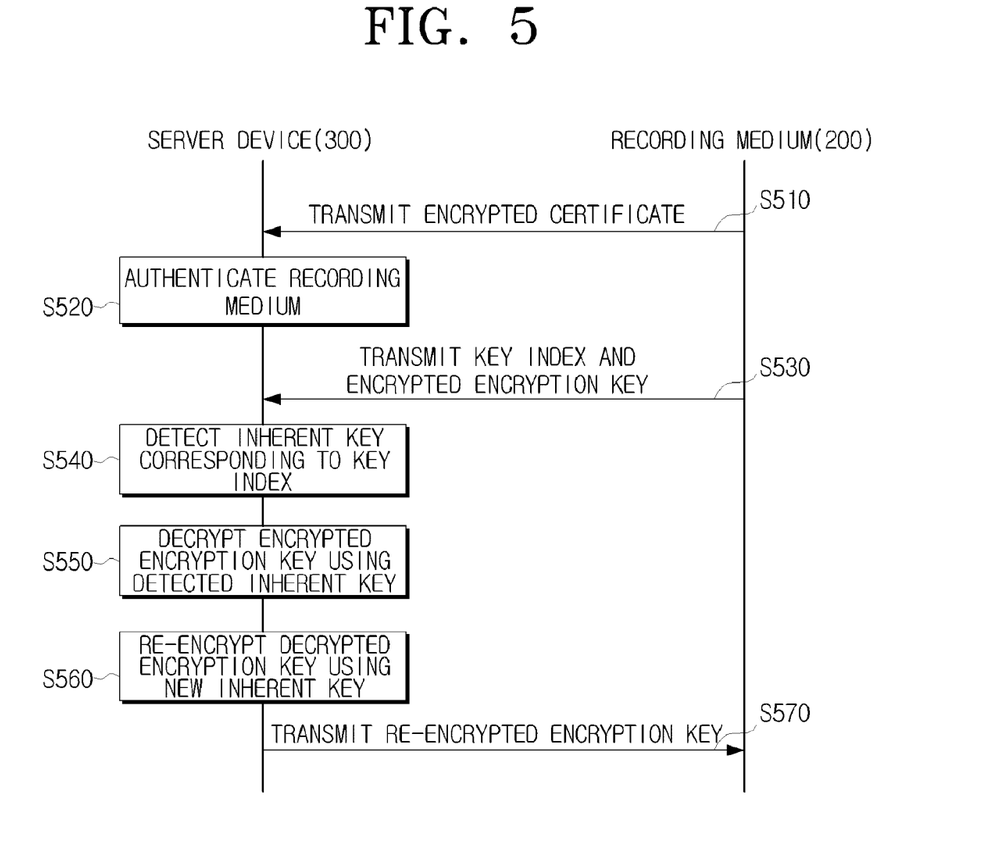
FIG. 5 is a flowchart describing a decryption method of a server device according to an exemplary embodiment of the present invention.

FIG. 5 is a flowchart describing a method of a server device decrypting an encrypted encryption key stored in a recording medium according to an exemplary embodiment of the present invention. That is, FIG. 5 illustrates a method for decrypting an encrypted encryption key stored in a recording medium when an electronic device is malfunctioning.

First, in operation S510, if the server device 300 is connected to the recording medium 200, the control unit 330 reads a certificate from the recording medium 200.

In operation S520, the control unit 330 authenticates the recording medium 200 by decrypting the certificate using a preset private key. The control unit 330 transmits to the recording medium 200 a message indicating that the authentication is successful or unsuccessful.

In operation S530, if the authentication is successful, the control unit 330 receives a key index and an encrypted encryption key from the recording medium 200. The encrypted encryption key is an encrypted key which is encrypted using the inherent key of the electronic device 100 before the electronic device 100 is malfunctioning, and the key index is a key index corresponding to the inherent key of the electronic device 100 before the electronic device 100 is malfunctioning.

The control unit 330 detects an inherent key corresponding to the received key index from the pre-stored inherent key list in operation S540, and decrypts the received encrypted encryption key using the detected inherent key in operation S550. The inherent key list includes inherent keys for a plurality of electronic devices and key indexes corresponding to each inherent key.

More specifically, the control unit 330 detects the inherent key corresponding to the key index received from the recording medium 200 from the inherent key list so that the encrypted encryption key received from the recording medium 200 is decrypted using the detected inherent key of the electronic device 100 before malfunctioning.

The control unit 330 re-encrypts the decrypted encryption key using a new inherent key of the repaired electronic device 100 in operation S560, and stores the re-encrypted encryption key in the recording medium 200 in operation S570. The new inherent key of the repaired electronic device 100 is one of the inherent keys in the inherent key list.

That is, if the electronic device 100 is malfunctioning, a main board of the electronic device 100 is replaced with a new one. Accordingly, the inherent key of the electronic device 100 and the key index corresponding to the inherent key are changed, so the control unit 330 re-encrypts the encryption key decrypted in operation S550 using a new inherent key of the repaired electronic device 100, and stores the re-encrypted encryption key in the recording medium 200.

As described above, the electronic device 100 according to the exemplary embodiment of the present invention receives a certificate from the server device 300, and decrypts the encrypted encryption key stored in the recording medium 200 by receiving the inherent key of the electronic device 100 through the server device 300 when the electronic device 100 is replaced with a new one, but the present invention is not limited thereto. The server device 300 may provide a web site to decrypt the encrypted encryption key stored in the recording medium 200, and the electronic device may access the web site and decrypt the encrypted encryption key.

The recording medium 200 may be a recording medium included in the electronic device 100, or an external recording medium which can be connected on the electronic device 100.

In the exemplary embodiments of the present invention, a digital television is provided as an image device, but this is merely an example for convenience of description. Accordingly, the inventive concept of the present invention can be applied to image devices other than digital televisions.

In addition, in the exemplary embodiments of the present invention, a digital television is provided as an electronic device, but this is merely an example for convenience of description. Accordingly, the inventive concept of the present invention can be applied to broadcast receiving devices and image devices other than digital televisions. The broadcast receiving device includes a set top box, a digital multimedia broadcasting (DMB) receiving device, a home theater, a television, and diverse portable devices having a broadcast receiving function (such as a mobile phone, a navigation device, and a personal multimedia player (PMP)). The image device includes a digital video disk (DVD) player, a personal computer, a digital camera, and a digital camcorder.

Furthermore, an electronic device or a recording medium is authenticated using a digital signature, but the present invention is not limited thereto. Diverse authentication methods, including a method for authenticating a device using an encryption algorithm, can be used.

As appreciated from the above description, a recording medium stores a key index corresponding to an inherent key of an electronic device and a server device manages an inherent key list, so that encrypted content stored in the recording medium can be decrypted when the electronic device is malfunctioning or is replaced with a new one.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic device comprising:
a storage unit which stores an inherent key and a key index corresponding to the inherent key; and
a control unit which generates an encryption key, encrypts the encryption key using the inherent key, and transmits the encrypted encryption key and the key index to a recording medium,
wherein the inherent key is a key which encrypts and decrypts the encryption key and is assigned to and stored in the electronic device during manufacture,
the encryption key is a key which encrypts and decrypts content,
when the inherent key becomes inaccessible, the control unit transmits the key index received from the recording medium to a server device,
receives the inherent key corresponding to the transmitted key index, from the server device,
decrypts the encrypted encryption key received from the recording medium using the received inherent key,
re-encrypts the decrypted encryption key using a new inherent key, and
transmits the re-encrypted encryption key to the recording medium.

2. The electronic device of claim 1, wherein the control unit encrypts a certificate received from the server device connected through a network using a public key, and transmits the encrypted certificate to the recording medium.

3. The electronic device of claim 1, wherein the control unit authenticates the recording medium using a private key received from the server device connected through a network, and transmits the key index received from the recording medium to the server device if the authentication is successful.

4. The electronic device of claim 1, wherein the control unit maps the key index with an identifier indicating a manufacturer, and transmits the key index mapped with the identifier to the recording medium.

5. The electronic device of claim 1, wherein the electronic device is a broadcast receiving device which transmits and receives a broadcast signal.

6. The electronic device of claim 1, wherein the inherent key and the key index are stored in the storage unit when the electronic device is manufactured.

7. The electronic device of claim 1, wherein the key index comprises an identifier of a manufacturer of the electronic device.

8. A server device comprising:
a storage unit which stores an inherent key list comprising inherent keys and key indices corresponding to the inherent keys, wherein an inherent key is a key which encrypts and decrypts an encryption key and is assigned to and stored in an electronic device during manufacture and the encryption key is a key which encrypts and decrypts content; and
a control unit which detects the inherent key corresponding to the key index received from a recording medium connected to the server device, decrypts an encrypted encryption key received from the recording medium using the detected inherent key, re-encrypts the decrypted encryption key using a new one of the inherent keys included in the inherent key list, and stores the re-encrypted encryption key in the recording medium, when the inherent key of the electronic device becomes inaccessible.

9. The server device of claim 8, wherein the inherent key list comprises the inherent keys that are assigned to each of the plurality of electronic devices during manufacture to serve as the key encryption keys, and each of the key indexes corresponds to each respective inherent key.

10. An encryption method comprising:
generating an encryption key;
encrypting content using the generated encryption key;
encrypting the encryption key using an inherent key; and
transmitting an encrypted certificate, the encrypted content, the encrypted encryption key, and a key index corresponding to the inherent key to a recording medium,
wherein at least one of the generating, the encrypting the content, the encrypting the encryption key, and the transmitting is performed by an electronic device,
the inherent key is a key which encrypts and decrypts the encryption key and is assigned to and stored in the electronic device during manufacture,
the encryption key is a key which encrypts and decrypts content, and
the method further comprises:
when the inherent key becomes inaccessible, transmitting the key index received from the recording medium to a server,
receiving the inherent key corresponding to the transmitted key index, from the server,
decrypting the encrypted encryption key received from the recording medium using the inherent key received from the server,
re-encrypting the decrypted encryption key using a new inherent key, and
transmitting the re-encrypted encryption key to the recording medium.

11. The encryption method of claim 10, further comprising:
encrypting the certificate received from the server; and
transmitting the encrypted certificate to the recording medium.

12. A decryption method comprising:
transmitting an encrypted encryption key and a key index corresponding to an inherent key to a recording medium, wherein the inherent key is a key which encrypts and decrypts the encryption key and is assigned to and stored in an electronic device during manufacture, and the encryption key is a key which encrypts and decrypts content,
when the inherent key of the electronic device becomes inaccessible, receiving, from a server, the inherent key corresponding the key index received from the recording medium;
decrypting an encrypted encryption key received from the recording medium using the received inherent key;
re-encrypting the decrypted encryption key using a new inherent key; and
storing the re-encrypted encryption key in the recording medium.

13. The decryption method of claim 12, further comprising:
authenticating the recording medium using a private key received from the server connected through a network.

14. A decryption method comprising:
transmitting a key index corresponding to an inherent key to a recording medium, wherein the inherent key is a key which encrypts and decrypts an encryption key and is assigned to and stored in an electronic device during manufacture, receiving an encrypted encryption key and the key index corresponding to the inherent key from the recording medium, when the inherent key of the electronic device becomes inaccessible;

detecting the inherent key corresponding to the key index from an inherent key list;

decrypting the encrypted encryption key using the detected inherent key corresponding to the key index;

re-encrypting the decrypted encryption key using a new inherent key; and storing the re-encrypted encryption key in the recording medium.

15. The decryption method of claim 14, further comprising:

receiving a certificate from the recording medium, and thereby authenticating the recording medium.

\* \* \* \* \*